Figure 1:
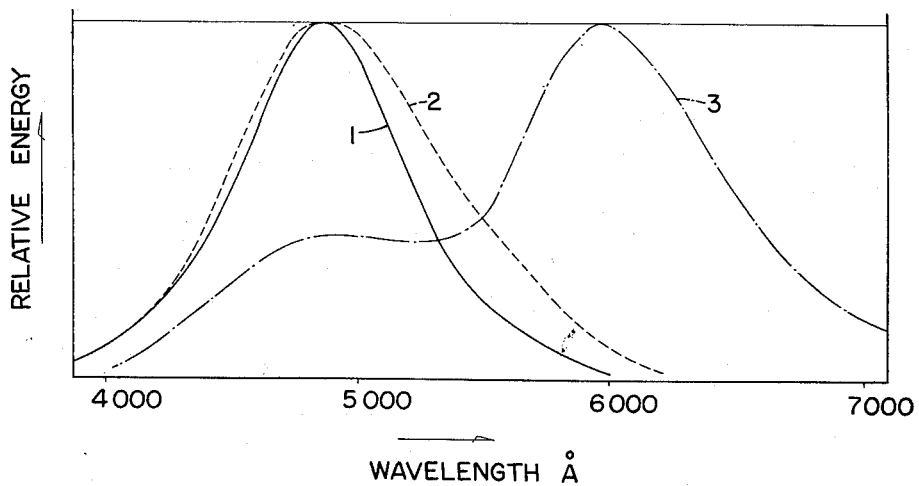

United States Patent Office 2,988,516
Patented June 13, 1961

2,988,516
MAGNESIUM-FLUORO-BORATE PHOSPHOR
Shigeru Kamiya, Takatsuki-shi, Osaka, Japan, assignor to Matsushita Electronics Corporation, Kita-Kawachi-gun, Osaka, Japan, a corporation of Japan
Filed Mar. 13, 1959, Ser. No. 799,345
6 Claims. (Cl. 252—301.5)

This invention relates to a phosphor being useful as luminescent material in low pressure mercury electric discharge lamp. More particularly, this invention is concerned with a titanium-activated phosphor which contains double salts of magnesium, boron and fluorine as the basic component and which is excited with short wave length of ultra-violet ray.

Heretofore, it is well known that a titanium-activated magnesium borate phosphor gives blue colored fluorescence, and in this case, however, a considerably large amount of titanium as the activator is disadvantageously required. This invention is essentially different from an already known phosphor such as titanium-activated magnesium borate phosphor, and has the features as follow.

The phosphor of this invention, at first place, has the proportion of a base material having the following formula.

$$x\text{MgO} \cdot y\text{B}_2\text{O}_3 \cdot z\text{MgF}_2$$

wherein $x$, $y$ and $z$ may vary effective in a wide range and their optimum values are determined depending upon the type of the used activator or the desired color of fluorescence, as described hereinbelow. In order to prepare the above base material, the mixture of magnesium oxide (MgO) or a material which can form MgO on firing, e.g. magnesium nitrate, boron oxide ($B_2O_3$) or a material which can form $B_2O_3$ on firing, e.g. ammonium tetra borate, and magnesium fluoride ($MgF_2$) or a material which can form $MgF_2$ on firing may be employed in this invention. For the preparation of the phosphor of this invention, such mixture together with the suitable activator is fired at a firing temperature of from about 1000° C. to about 1100° C. For example, previously purified magnesium oxide, boric acid, magnesium fluoride and titanium dioxide may be mixed and then fired to produce a phosphor of this invention. But also it is possible to compound various salts of each component of the phosphor in such a proportion that the desired basic material can be formed on firing, according to either wet or dry process prior to firing.

In this invention, titanium is commonly used as activator. Tungstic or molybdic ion is jointly used as activator in the combination with titanium. Further manganese is used as a secondary activator for the titanium-activated phosphor.

The phosphor of this invention, when activated with titanium alone, gives bluish-white fluorescence. In order to give a bright fluorescence, the phosphor has such a proportion of the base material that $x$ is from 1 to 4, $y$ is 1 and $z$ is from 0.5 to 2. Most preferably $x$ is 3, $y$ is 1 and $z$ is 1 to 2. Although in the examples hereinbelow the activator is specified with the reference to titanium dioxide, it will be understood from this specification by those skilled in the art, that the activator employed herein may include titanium compound such as the dioxide, phosphate or titanate, or materials which can form such compound on firing. In order to give fluorescence, the amount of titanium to be incorporated to a base material may be within a range of from 0.007 to 0.03 mole per mole of the base material. Approximately 0.015 mole of titanium may result in the most preferable emission strength (see FIG. 2).

When the phosphor of this invention is activated jointly with tungstic or molybdic ion in the combination with titanium, the above described definitions of $x$, $y$ and $z$ are effectively employed. But such a range that $x$ is 1 to 1.5, $y$ is 1 and $z$ is 0.5 to 1 is most preferred.

Tungstic and molybdic acid may be used in the relatively large amount, i.e. from 0.1 mole to 0.7 mole. In this case, the amount of titanium to be incorporated may vary within a range between 0.005 and 0.02 mole, thereby the color tone of fluorescence of the produced phosphor varies little by little depending upon said titanium amount.

If manganese is used as a secondary activator to effect double activation of the titanium-activated phosphor, the resulting phosphor having emission bands of titanium as well as manganese gives bluish-white colored fluorescence which turns into reddish-orange color according to an increase of the amount of manganese. Also in this case, the base material of the phosphor should have such a proportion that $x$ is equal to 1 to 4, $y$ is 1 and $z$ is equal to 0.5 to 2. The amount of manganese may vary within a range of from 0.01% to 0.5% by weight based on the weight of a base material. In this invention, if the type and the amount of activator are suitably selected, a variety of emission color will be obtained.

As understood from the above description, the phosphor of this invention is entirely different from the conventional, titanium-activated magnesium borate phosphor. Furthermore, there is one of the most characteristics of this invention.

In the accompanying drawing,

FIGURE 1 shows energy distribution or relative energy of certain phosphors of this invention. Curve 1 relates to the phosphor activated with titanium alone. Curve 2 relates to the phosphor co-activated with titanium and tungstic acid. And curve 3 relates to the phosphor effected with double activation of titanium and manganese.

Figure 2:
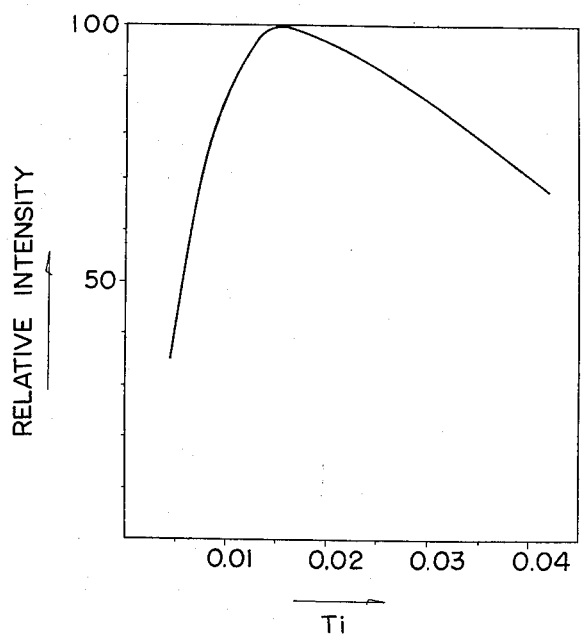

FIGURE 2 shows the relationship between the amount of an activator (mole/mole of base material) and relative intensity.

The following examples will serve to show the features and characteristics of this invention, and also indicate how the proportions of ingredients in the starting composition may be chosen.

Example 1

| | Moles |
|---|---|
| Magnesium carbonate | 3.0 |
| Ammonium tetraborate | 0.5 |
| Magnesium fluoride | 2.0 |
| Titanium dioxide | 0.015 |

The mixture having the above described compositon is finely grinded with ball mill, and thereafter filled into quartz crucible, and then subjected to firing in electric furnace at 1150° C. for one hour. After cooling in the air, the thus treated mixture is ground in ball mill once again, and then fired at 1150° C. for 2 hours to produce the phosphor which emits bluish-white fluorescence.

Example 2

| | Moles |
|---|---|
| Magnesium carbonate | 1.0 |
| Ammonium tetraborate | 0.5 |
| Magnesium fluoride | 1.0 |
| Titanium dioxide | 0.015 |
| Ammonium para-tungstate | 0.07 |

The mixture having the above composition is subjected to firing in electric furnace at 1000° C. for 4 hours, and thus the phosphor which emits bluish-white fluorescence is obtained.

Example 3

| | Moles |
|---|---|
| Magnesium nitrate | 1 |
| Ammonium tetraborate | 0.25 |
| Magnesium fluoride | 1 |
| Titanium dioxide | 0.02 |
| Manganese carbonate | 0.02 |

The mixture of the above ingredients is heated and concentrated in a quartz-made evaporating dish to dryness. This mixture is fired provisionally at 600° C. for one hour, and then finely powdered. Thereafter the thus treated mixture is subjected to firing once again in electric furnace at 1150° C. for one hour, and thus the phosphor which emits white fluorescence is obtained.

In firing the use of a fusing agent such as lithium fluoride, magnesium chloride, magnesium sulphate, ammonium fluoride or ammonium chloride, in the amount not exceeding 0.2 mole per one mole of base material serves to shorten the period of firing.

Example 4

| | Moles |
|---|---|
| Magnesium oxide | 3 |
| Ammonium tetraborate | 0.5 |
| Magnesium fluoride | 2 |
| Titanium dioxide | 0.015 |
| Lithium fluoride | 0.15 |

The above ingredients are well mixed, and then the resulting mixture is fired at 1100° C. for one hour to produce the phosphor emitting fluorescence of the same color as in Example 2.

I claim:

1. A phosphor having the composition of the base material designated with the formula $$xMgO \cdot yB_2O_3 \cdot zMgF_2$$

wherein $x$ is from 1 to 4, $y$ is 1 and $z$ is from 0.5 to 2, and being activated with one activator selected from the group consisting of titanium alone in amounts of from about 0.007 to 0.03 mole per mole of the base material, titanium together with tungstic acid, titanium together with molybdic acid, and titanium together with manganese, titanium in each of the aforesaid mixed activators being present in amounts of from about 0.005 to 0.02 mole, the respective acid being present in amounts of from about 0.01 to 0.7 mole, each per mole of the base material, and manganese being present in amounts of from about 0.01 to 0.5% by weight, based on the weight of the base material.

2. A phosphor having the composition of the base material designated with the formula $$xMgO \cdot yB_2O_3 \cdot zMgF_2$$

wherein $x$ is from 1 to 4, $y$ is 1 and $z$ is 0.5 to 2, and being activated with titanium together with manganese, said titanium being present in the amount of 0.02 mole as titanium dioxide per one mole of the base material and said manganese being in the amount of 0.02 mole as manganese carbonate per one mole of the base material.

3. A phosphor having the composition of the base material designated with the formula $$xMgO \cdot yB_2O_3 \cdot zMgF_2$$

wherein $x$ is from 1 to 4, $y$ is 1 and $z$ is from 0.5 to 2, and being activated with titanium in the amount of approximately 0.015 mole as titanium dioxide per one mole of said base material.

4. A phosphor having the composition of the base material designated with the formula $$xMgO \cdot yB_2O_3 \cdot zMgF_2$$

wherein $x$ is from 1 to 4, $y$ is 1 and $z$ is from 0.5 to 2, and being activated with titanium together with tungstic acid, said titanium being present in the amount of about 0.015 mole, as titanium dioxide, per one mole of the base material and said tungstic acid being present in the amount of about 0.07 mole, as ammonium para-tungstate, per one mole of the base material.

5. A phosphor having the composition of the base material designated with the formula $$xMgO \cdot yB_2O_3 \cdot zMgF_2$$

wherein $x$ is from 1 to 4, $y$ is 1 and $z$ is from 0.5 to 2, and being activated with titanium together with molybdic acid, said titanium being present in the amount of about 0.015 mole as titanium dioxide per one mole of the base material and said molybdic acid being present in the amount of about 0.07 mole as ammonium paramolybdate per mole of the base material.

6. A method of preparing a phosphor having the composition designated with the formula $$xMgO \cdot yB_2O_3 \cdot zMgF_2$$

wherein $x$ is from 1 to 4, $y$ is 1 and $z$ is 0.5 to 2, being activated with an activator selected from the group consisting of titanium alone, titanium together with tungstic acid, titanium together with molybdic acid, and titanium together with manganese, which comprises firing a mixture at a temperature of about 1100° C. for one to two hours, said mixture comprising 1 to 4 moles of a magnesium compound selected from the group consisting of magnesium oxide, magnesium carbonate and magnesium nitrate, 1 mole of ammonium tetraborate, 0.5 to 2 moles of magnesium fluoride, and an activator source material selected from the group consisting of titanium dioxide alone in amounts sufficient to introduce into the phosphor titanium in amounts of from about 0.007 to 0.03 mole per mole of the base material, titanium dioxide together with ammonium para-tungstate, titanium dioxide together with ammonium para-molybdate, and titanium dioxide together with manganese carbonate, titanium dioxide in the aforesaid mixed activating agents being added, respectively, in amounts sufficient to introduce into the phosphor from about 0.005 to 0.02 mole of titanium, and the other component of the mixed activating agents being added in amounts sufficient to introduce into the phosphor the respective second activator component in amounts of from about 0.01 to 0.7 mole, each per mole of the base material.

References Cited in the file of this patent

UNITED STATES PATENTS 2,758,094    Ranby    Aug. 7, 1956